United States Patent [19]

Stosz, Jr. et al.

[11] 4,011,818
[45] Mar. 15, 1977

[54] WARHEAD EXPLOSIVE LINER

[75] Inventors: Max J. Stosz, Jr., Ellicott City; Harold F. Eccleston, Jr., Silver Spring, both of Md.

[73] Assignee: The United States of America as represented by the Secretary of the Navy, Washington, D.C.

[22] Filed: Apr. 1, 1976

[21] Appl. No.: 672,697

[52] U.S. Cl. .......................... 102/56 R; 149/19.9
[51] Int. Cl.$^2$ ..................................... F42B 13/00
[58] Field of Search .................. 102/56, 59, 103; 149/19.9

[56] References Cited

UNITED STATES PATENTS

| 3,726,829 | 4/1973 | Sayles | 102/103 |
|---|---|---|---|
| 3,749,024 | 7/1973 | Pakulak | 102/56 R |
| 3,813,308 | 5/1974 | Skidmore | 102/103 |
| 3,983,820 | 10/1976 | Crepin | 102/56 R |

Primary Examiner—Edward A. Miller
Attorney, Agent, or Firm—R. S. Sciascia; A. L. Branning; R. D. Johnson

[57] ABSTRACT

An improved warhead liner which is made up of (A) a first layer composed of (1) a polyurethane elastomer which is the reaction product of a hydroxy-terminated polydiene intermediate polymer and a diisocyanate, (2) a hydrocarbon process oil, (3) hollow phenolic microspheres, (4) carbon black, and (5) asbestos fibers; and (B) a second layer composed of a hard, solvent-resistant epoxypolyamide; the first layer covers the inside surface of the warhead casing and the second layer covers the inside surface of the first layer. This liner is particularly suited for use in warheads containing rubbery, plasticized nitrocellulose explosives.

14 Claims, No Drawings

WARHEAD EXPLOSIVE LINER

BACKGROUND OF THE INVENTION

This invention relates to liners and more particularly to liners for warheads.

High powered explosives used in ordnance are sensitive, potentially dangerous materials which must be properly sealed in their containers or warheads. These explosives must be kept out of joints, weld cracks, threads, etc., where they may be pinched and detonated during even normal handling. Further, these explosives must be protected from external chemical attack by water, oils, fuels, and other materials. Moreover, the explosives must be effectively sealed off to prevent the explosives or their ingredients (e.g. plasticizers) from exuding or migrating outside of the warhead or container during long storage or during exposure to extreme environmental conditions. Finally, the explosives should be protected against heat caused by fires or against shocks caused by rough handling.

Commonly the inside surface of the container or warhead casing is lined with a nonenergetic sealer material which serves as a barrier between the explosive and the casing. The liner should be easy to apply and must be compatible with the explosive. The material usually used as a liner for trinitrotoluene based explosives is an asphaltic composition called "hot-melt." However, hot-melt has several disadvantages. First, hot-melt has to be applied at temperatures of from 400° to 500° F; these high temperatures can cause aluminum warheads to distort and can damage internal components and materials such as flexible conduits, wire insulation, potting compounds, and adhesives. Second, hot-melt is a thermoplastic material which can cold-flow or creep under pressure at military environmental temperatures. Exuding hot-melt may clog up electrical connectors, exploder wells, or other mating surfaces. Finally, hot-melt provides poor high temperature protection for the explosive because hot-melt quickly melts when exposed to the high temperatures produced by fires. The explosive can then shift closer to the warhead casing where it is more likely to ignite.

An epoxy/glass-microballoon liner system was used in the MK 46 torpedo warheads. The liner was processed and applied at room temperature, and then dried and cured at a slightly elevated temperature. Unfortunately, this epoxy liner was found to be hard and brittle and cracked very easily; as a result, the epoxy liner did not provide good protection for the explosive. Flexible epoxies are available which do not crack as readily; however, these flexible epoxies are not as effective as the hard epoxies in stopping liquid plasticizers from migrating out of explosives.

SUMMARY OF THE INVENTION

Accordingly, it is an object of this invention to provide a warhead liner which can be applied at relatively low temperatures.

Another object of this invention is to provide a warhead liner which will not easily break or crack.

A further object of this invention is to provide a warhead liner which protects the explosive against attack by water, oils, fuels, and other materials.

Still another object of this invention is to provide a warhead liner which prevents the explosive's plasticizers from migrating away from the explosive.

Yet another object of this invention is to provide a liner which cushions the explosive against impact shocks.

A still further object of this invention is to provide a warhead liner which insulates the explosive against heat.

Another object of this invention is to provide a liner which will not readily melt when exposed to the heat of a fire.

These and other objects of this invention are accomplished by providing a two layer warhead liner comprising:

A. a first layer composed of a filled polyurethane elastomer formed by curing an intimate mixture comprising:
   1. a hydroxy-terminated polydiene intermediate polymer wherein:
      a. the polydiene chain of the intermediate polymer is formed by polymerizing 1,3-diene monomers of from 4 to 6 carbon atoms, the monomers having the formula

wherein $R_1$ is selected from the group consisting of —H, —CH$_3$, and —CH$_2$CH$_3$ and $R_2$ is selected from the group consisting of —H and —CH$_3$, provided that when $R_1$ is —CH$_2$CH$_3$, $R_2$ is —H, and wherein the polydiene chain may be the polymerization product of a single monomer type or a mixture of different monomer types of the above formula;
      b. the polydiene chain of the intermediate polymer has a cis-1,4-type of unsaturation content of from 10 to 30 percent, a trans-1,4-type of unsaturation content of from 40 to 70 percent, and a vinyl (1,2)-type of unsaturation content of from 10 to 30 percent;
      c. the intermediate polymer has an average of from about 1.8 to about 2.5 predominantly primary, terminal, allylic hydroxy groups per average molecule; and
      d. the average molecular weight of the intermediate polymer is from about 1,000 to about 5,000;
   2. a hydrocarbon process oil, wherein the weight of hydrocarbon process oil used is from more than zero to about 4 times the weight of hydroxy-terminated polydiene intermediate polymer used;
   3. a diisocyanate in an amount sufficient to supply from about 0.7 to about 1.3 isocyanate functional groups for each hydroxy functional group on the intermediate polymer;
   4. hollow phenolic microspheres constituting from more than zero to about 20 percent by weight of the total uncured mixture;
   5. carbon black constituting from more than zero to about 15 percent by weight of the total uncured mixture; and
   6. asbestos fibers constituting from more than zero to about 8 percent by weight of the total uncured mixture;

B. a second layer composed of a hard, solvent-resistant epoxy-polyamide.

The first layer covering the inner surface of the warhead casing and the second layer covering the inner surface of the first layer.

DETAILED DESCRIPTION OF THE PREFERRED EMBODIMENT

The present invention is concerned with a novel two layer liner for warheads containing plasticized, rubbery explosives. The first layer covers the inner surface of the warhead casing and is made up of a filled polyurethane elastomer. This first layer serves to protect the explosive from fire, moisture, and impact shocks. The second layer comprises a hard epoxy-polyamide coating which covers the inner surface of the first layer. This second layer acts as a barrier, preventing the migration of plasticizers from the explosive.

These layers can be easily formed by slosh or roll coating. For instance, the first layer may be formed by pouring in an excess of a liquid mixture of the uncured ingredients of the filled polyurethane elastomer and then sloshing or rolling around the liquid mixture until the inner surface of the casing is completely covered. The excess of the mixture is then drained from the casing and the mixture coating the inner surface of the warhead casing is then cured to form the filled polyurethane elastomer. This procedure may be repeated to increase the thickness of the first layer. Likewise, the second layer may be formed by pouring in an excess of the uncured epoxy-polyamide mixture into the warhead, sloshing or rolling it around until the inner surface of the first layer has been completely coated. The excess of uncured epoxypolyamide is then drained from the warhead and the epoxy-polyamide coating is completely cured to form a hard, solvent-resistant epoxy-polyamide barrier layer. Obviously, methods other than slosh or roll coating may be used to apply the uncured ingredients of these layers, such as spray coating. However, both the slosh and the roll coating techniques are very convenient to use.

After the hard, solvent resistant epoxy-polyamide layer has been adequately cured, the warhead is filled with the rubbery, plasticized explosive. A convenient method of doing this is to pour the explosive into the warhead in an uncured or partially cured liquid state, and then to cure the explosive to a rubbery consistency while it is in the warhead. Finally, the exposed surfaces of the explosive may be covered first with a topping layer of a modified filled polyurethane elastomer, and then a layer of the hard, solvent resistant epoxy-polyamide. A layer of silicone foam rubber is then used to cushion this epoxy-polyamide layer and to provide expansion room for the explosive, especially at high temperatures.

The liquid mixture which is cured to form the filled polyurethane elastomer covering the inner surface of the warhead casing comprises a hydroxy-terminated polydiene intermediate polymer, a diisocyanate, a hydrocarbon process oil as a plasticizer, hollow phenolic microspheres, carbon black, asbestos fibers, and a catalyst to accelerate the reaction between the hydroxy-terminated polydiene intermediate polymer and the diisocyanate. Preferably, an antioxidant should also be added to protect the unsaturation of the polydiene chains.

The polydiene chain of the hydroxy-terminated polydiene intermediate polymer is formed by polymerizing 1,3-diene monomers having from 4 to 6 carbon atoms and the formula

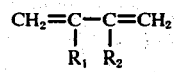

wherein $R_1$ is selected from the group consisting of —H, —CH$_3$ and —CH$_2$CH$_3$ and $R_2$ is selected from the group consisting of —H, and —CH$_3$, provided that when $R_1$ is —CH$_2$CH$_3$, $R_2$ is —H. The diene chain may be formed by polymerizing a single monomer type or a mixture of monomer types. Examples of diene monomers which may be used are 1,3-butadiene, 2-methyl-1,3-butadiene, 2,3-dimethyl-1,3-butadiene, and 2-ethyl-1,3-butadiene; mixtures of these monomers may also be used. Of these diene monomers, 1,3-butadiene is preferred because it produces polydiene chains with the greatest degree of unsaturation and thus, potentially, the greatest degree of elasticity.

However, the elasticity is provided only by the double bonds occurring in the main hydrocarbon chain (cis-1,4- and trans-1,4-types of unsaturation) and not by the vinyl (1,2) type of unsaturation. The cis-1,4-type of unsaturation can be represented by the formula:

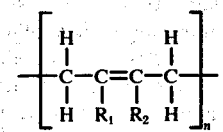

the trans -1,4-type by

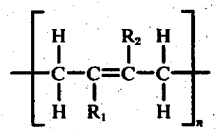

and the vinyl (1,2) type by

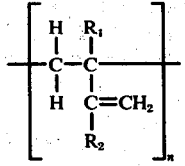

wherein $R_1$ and $R_2$ vary independently and are selected from the group consisting of H, —CH$_3$, and —CH$_2$CH$_3$, provided that if either $R_1$ or $R_2$ is —CH$_2$CH$_3$, the other must be H. For the present invention about 70 to about 90 percent of the unsaturation should occur in the main carbon chain of the hydroxy-terminated polydiene intermediate polymer (i.e. cis-1,4- and trans-1,4-type unsaturation) with only about 10 to about 30 percent of the unsaturation being of the vinyl (1,2) type. Preferably the type of unsaturation should be from 10 to 30 percent cis-1,4-type, from 40 to 70 percent trans-1,4-type, and from 10 to 30 percent vinyl (1,2) type; more preferably from 15 to 25 percent cis-1,4-type, from 50 to 65 percent trans-1,4-type, and from 15 to 25 percent vinyl (1,2) type; and most preferably from 18 to 22 percent cis-1,4-type, from 58 to 62 percent trans-1,4- type, and from 18 to 22 percent vinyl (1,2) type unsaturation.

The location, type, and number of hydroxy functional groups on the intermediate polymer are critical. It is important that the hydroxy groups are located predominately in the terminal positions of the main carbon chain of the intermediate polymer, for this results in a more flexible, linear (versus branched) polymer and in less cross-linking of the polymer in the final filled polyurethane elastomers and thus in greater elasticity. The hydroxy functional groups should also be predominantly primary and allylic in configuration (i.e. $-CH = CHCH_2OH$) because this results in a faster curing rate. Finally, there should be an average of from about 1.8 to about 2.5 and preferably from 2.1 to 2.3 hydroxyl groups per molecule of intermediate polymer.

Two other important factors are the molecular weight and the viscosity of the hydroxy-terminated diene intermediate polymers. The molecular weight of the intermediate polymers used are in the range of about 1000 to 5000, and preferably 2000 to 3500. The viscosity of the intermediate polymers used are in the range of from about 20 to about 300, but preferably from 35 to 65 poises at 30° C.

Organic diisocyanates which may be used in this invention include aromatic, aliphatic and cycloaliphatic diisocyanates, as for example: 2,4-toluene diisocyanate, 2,6-toluene diisocyanate, p-phenylene diisocyanate, 1,5-napthylene diisocyanate, 4,4'-biphenylene diisocyanate, p,p'-methylene diphenyl diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate), 1,5-tetrahydronapthylene diisocyanate, and polymethylenepolyphenylisocyanate (PAPI). Mixtures of diisocyanates may also be used. Diisocyanates having both isocyanate groups attached directly to aromatic rings are preferred because they usually react much more rapidly with the hydroxy-terminate diene intermediate polymers. In these preferred aromatic diisocyanates, the two isocyanate groups may be attached either to the same or to different aromatic rings. More preferred are 2,4-toluene diisocyanate, 2,6-toluene diisocyanate, or mixtures thereof; 2,4-toluene diisocyanate is the most preferred diisocyanate for this invention. The diisocyanate is used in an amount sufficient to supply from about 0.7 to about 1.3, but preferably from 0.8 to 1.0 isocyanate function groups for each hydroxy functional group on the hydroxy-terminated diene intermediate polymers.

The hydrocarbon process oil used as a plasticizer in the filled, polyurethane elastomeric layer should preferably have the following physical and chemical properties: (1) a viscosity of from about 100 to about 120 SUS [i.e., Saybolt Universal seconds], but more preferably from 104 to 114 SUS at 100° F; (2) a open cup flash point of from about 280° F to about 380° F, but more preferably from 300° F to 360° F; (3) a pour point of from about −40° F to about −70° F, but more preferably from −45° F to −65° F; (4) an acid number (mg KOH) of less than 0.015, but more preferably less than 0.01; and (5) an API Gravity of from about 23 to about 26, but more preferably from 23.8 to 25.2. Table I lists the American Society for Testing and Materials tests which are used to test for these properties.

TABLE I

| Test No. 1 | Property |
|---|---|
| D88 | Saybolt Viscosity |
| D92 | Flash point by Cleveland open cup |
| D97 | pour point |
| D664 | acid number, mg KOH |
| D-287 | API Gravity |

Finally, the weight of hydrocarbon process oil used should be from more than zero to about four and preferably from 0.8 to 1.2 times the weight of the hydroxy-terminated diene intermediate prepolymer used. Most preferred is the use of equal amounts by weight of the hydrocarbon process oil and the intermediate polymer.

The solid filler ingredients of the urethane elastomer of the first layer of the liner are hollow phenolic microspheres, carbon black, and asbestos fibers. Preferably these solid ingredients should be screened so that the size of all of particles or agglomerates are in the range of from 8 to 100 mesh.

The hollow phenolic microspheres should constitute from more than zero to about 20.0, and preferably from 8.0 to 13.0, and more preferably from 9.50 to 10.50 percent by weight of the total uncured mixture which is to form the filed, polyurethane elastomer. These hollow phenolic microsphere should have an average density of 0.25 grams/cc or less. Moreover, a particle size determination in accordance with method B of the American Society of Testing and Materials, S Test ASTM D 1921 should result in 0.2 percent or less of the hollow phenolic microspheres being retained on a 40-mesh sieve after screening.

The carbon black should constitute from more than zero to about 15.0, but preferably from 3.0 to 8.0, and more preferably from 4.9 to 5.1 percent by weight of the total uncured mixture which is to form the filed, polyurethane elastomer. Preferably the surface area of the carbon black should be from 87 to 126 square meters per gram as determined by ASTM D3037. Moreover, it is preferably that the percentage of fixed carbon in the carbon black be at least 94 percent. Note that the carbon black serves both to fill the polyurethane and to render the polyurethane opaque.

The asbestos fibers are added to help retain the mixture on the inside surface of the warhead casing during the coating and curing process — until the first layer of the liner is solidified. The asbestos fibers should constitute from more than zero to about 8.0, but preferably from 1.0 to 3.0, and more preferably from 1.9 to 2.1 percent by weight of the total uncured mixture. Preferably, the asbestos fibers should not be more than one tenth of an inch long and should have a surface area of not less than 11,000 square centimeters per gram.

In addition to the above ingredients, conventional urethane catalysts such as stannous octoate, diazobicyclooctane, dibutyl tin dilaurate, lead napthenate, cobalt naphthenate, and the like may be added to catalyze the reaction between the isocyanate and hydroxy groups. For example, using dibutyl tin diluarate in an amount which is from about 0.002 to about 0.4, but preferable from 0.002 to 0.005 percent of the total weight of the uncured mixtures works well. This percentage can be varied to change pot-life and cure time or temperature.

As is well known in the polymer art, it is desirable to add an antioxidant to protect the unsaturation in the polydiene chain. For example, 4,4'-methylene bis (2,6-di-tert-butylphenol) in an amount of from about 0.4 to about 0.6 percent by weight of the total uncured mixture works well. However, there are many other antioxidants well known in the art which may also be used.

Although the ingredients may be mixed in any order, it is preferable to first thoroughly mix the hydroxy-terminated diene intermediate polymer, asbestos, carbon black, urethane catalyst, and antioxidant together; then to add and thoroughly mix in the hydrocarbon process oil and hollow phenolic microspheres. Finally, the diisocyanate is added and mixed in thoroughly. It is preferable to perform all of these mixing steps at a temperature of from about 50 to about 75° F and an absolute pressure of 1.0 inches of mercury or less.

The resulting mixture is applied to the inside surface of the warhead casing. As stated before, this may be easily accomplished by rolling or sloshing the mixture around until all of the inner surface is covered and then draining the excess mixture from the warhead. The mixture is applied within a few hours after the diisocyanate has been added.

The mixture is then heat cured at a relatively low temperature; a preferred temperature range for curing is from 70° F to 140° F. The advantages of this method of curing are that lightweight metals (e.g. aluminum) will not be distorted at these low temperatures and that the need for special or complex curing facilities is minimized. It is preferable that this curing step is continued until an indentation hardness of the liner is at least 65 as measured by using the procedures of ASTM method D 2240-68 with a type 00 Shore Durometer. The curing may take from about 16 hours to about 168 hours (one week) depending on the curing temperature and the composition of the mixture.

Tests have demonstrated that the filled polyurethane layer is compatible with plasticized, rubbery, nitrocellulose based explosives. However, the plasticizers in the rubber explosive, such as metriol trinitrate and triethylene glycol dinitrate can migrate (by molecular diffusion) through the filled polyurethane layer of the liner. When this happens, pools of these energetic plasticizers collect in voids and up against the inner surface of the warhead casing, presenting a potential hazard.

In contradistinction, hard epoxy-polyamide coatings are resistant to solvents and are able to stop (act as a barrier to) the migration of the plasticizers from the rubbery explosives. However, these epoxy-polyamides are brittle and crack easily. When this happens, the plasticizers are then able to migrate away from the explosive especially before the explosive is cured to a solid. However, it has been unexpectedly discovered in this invention, that the filled polyurethane layer and the rubbery, plasticized explosives cushion the hard epoxy-polyamide layer enough so that the epoxy-polyamide does not readily crack even when the warhead is subjected to severe impact shocks. Therefore, an important feature of this invention is the use of a solvent resistant hard epoxy-polyamide coating between filled polyurethane layer and the rubbery explosive.

Several precautions should be taken in forming the epoxy-polyamide layer. First, the epoxy-polyamide coating should be thoroughly dried and cured before the explosive is put into the warhead. Otherwise, the solvents used in most common epoxy-polyamide mixtures will attack the rubbery explosives. This is particularly true when nitrocellulose based rubbery explosives are used. Second, plasticizers and flexibilizers reduce the effectiveness of the epoxy-polyamide as a barrier, permitting plasticizers to migrate from the explosive. Therefore, plasticizers and flexibilizers should not be used in the epoxy-polyamide coating, unless it is demonstrated that they will not seriously affect the barrier characteristics of the epoxy layer.

Epoxy-polyamide paints such as those listed in the table in column 6 U.S. Pat. No. 3,882,784 entitled "Nitroester Propellant, Casing, and liner of an epoxy-polyamide Copolymer Containing a Stabilizer," by George W. Nauflett and Craig E. Johnson, may be used in the present invention. These epoxy-polyamide paints can also be found in military specification M1L-C-22750C. Of these paints white is preferred for use in this invention. These paints and other similar epoxy-polyamide resins are stored as two separate component mixtures: one containing the epoxy and the other the polyamide. When the epoxy-polyamide paint is to be used, the two component mixtures are mixed together and then allow to set for a short period of time until the mixture is of suitable viscosity for slosh coating — usually this takes from a few minutes to a few hours. When the M1L-C-22750C epoxy-polyamide paint is used, a one hour setting time is preferred.

After the epoxy-polyamide mixture has set enough, it is used to cover the inner surface of the filled polyurethane layer, usually by slosh or roll coating. The epoxy resin is then dryed and thoroughly cured. Thorough curing and drying is important because the solvents and unreacted components will attack and damage the rubbery explosive.

After the epoxy-polyamide coating has been thoroughly cured, the liquid explosive mixture is poured into the warhead and cured in place to a tough rubbery consistency. The explosives with which the liner of the present invention is used have a nitrocellulose base, conventional solid explosive components, and plasticizers such as metriol trinitrate and triethylene glycoldinitrate (with stabilizers such as ethyl centralite and resorcinol) in sufficient quantity to give the explosive a rubbery consistency even after it is completely cured.

The next step is to cover the remaining exposed surface of the explosive with protective layers of polyurethane and epoxy-polyamide. Because an uncured epoxy-polyamide solvent mixture will damage the explosive, the epoxy-polyamide coating cannot be applied directly to the explosive. Instead, a polyurethane potting compound is used to cover the remaining exposed surface of the explosive. This potting compound is a modified form of the filled polyurethane elastomer which is used in the liner. The asbestos is eliminated and only about one-half as much by weight of the hollow phenolic microspheres are used. The proportions of hydroxy-terminated polydiene intermediate polymer, hydrocarbon process oil, and diisocyanate are increased to make up the difference in weight. The same weight percent of carbon black is used, however. The ingredients of the potting compound are preferably mixed in the same order as the ingredients in the filled polyurethane layer. A layer of potting compound is poured into the warhead so that it covers the exposed surface of the explosive, and the polyurethane potting compound is then cured. A coating of the same type of epoxy-polyamide mixture used in the liner is used to cover the exposed surface of the cured polyurethane potting compound; the coating is then completely cured to form a hard epoxy-polyamide layer. This epoxy-polyamide layer is covered with a cushioning protective coating such as silicon foam rubber which is covered with a thin covering of solid silicon rubber.

The general nature of the invention having been set forth, the following example is presented as a specific illustration thereof. It will be understood that the invention is not limited to this specific example, but is susceptible to various modifications that will be recognized by one of ordinary skill in the art.

EXAMPLE

The warhead casing was a hollow aluminum cylinder closed at one end and having a length of 52.5 inches and an internal diameter of 18.25 inches. The interior surfaces of the warhead casing were inspected and cleaned, and then an even coating of fluorocarbon dispersion lubricant (M1L-L-60326), type I, was sprayed over the interior surface of the warhead casing. The ingredients for the filled polyurethane elastomeric layer were mixed as follows: (A) 40 parts by weight of hydroxy-terminated 1,3-polybutadiene intermediate polymer (Poly B-D, R-45M) having an equivalent weight of from 1250 to 1430, an average of 2.1 to 2.3 hydroxy groups per molecule, a viscosity of from 35 to 65 poises at 30° C, from 18 to 22 percent cis-1,3 type, from 58 to 62 percent trans-1,3 type, and from 18 to 22 percent vinyl (1,2) type unsaturation, (B) 0.005 parts by weight dibutyltin dilaurate, (C) 0.5 parts by weight 4,4'-methylene bis (2,6-di-tert-butylphenol), (D) 2.0 parts by weight asbestos fibers having a length of less than 0.1 inch and a surface area of not less than 11,000 square centimeters per gram; and (E) 5.0 parts by weight of carbon black were mixed together for 30 minutes. Next, (F) 40.0 parts by weight of a hydrocarbon process oil having (1) a viscosity of from 104 to 114 SUS at 100° F; (2) an open cup flash point of from 300° F to 360° F; (3) a pour point of from −45° F to −65° F; (4) an acid number (m.g. KOH) of less than 0.01; and (5) an API Gravity of from 23.8 to 25.2; and (G) 10.0 parts by weight of hollow phenolic microspheres having an average density of 0.25 grams/cc or less were added to the mixture and the entire mixture was thoroughly mixed for 20 minutes. Then, 2.495 parts by weight of 2,4-toluene diisocyanate were added and the entire mixture was mixed for another 20 minutes. All of the above mixing steps were conducted at a temperature of from 50° F to 75° F and an absolute pressure of 1.0 inches of mercury or less. All solid ingredients were screened through an 8-mesh to 100-mesh screen before being added to the mixture. Finally, a particle sized determination in accordance to ASTM D 1921 resulted in less than 0.2 percent of the hollow phenolic microspheres being retained on a 40-mesh sieve after screening.

75 pounds of the mixture were poured into the warhead casing. The warhead casing was rolled around until all of the interior surface was coated. The excess of the mixture was poured out of the casing. (Note: the mixture must be used within approximately 6 hours after the diisocyanate has been mixed into it). The mixture was cured at 140° F for 16 hours to form the filled polyurethane elastomer. During the curing step, the warhead casing was positioned so that any excess of mixture remaining would drain off. After this curing step, the inner surface of the warhead was inspected for bare spots which were patched by applying mixture to those spots and then repeating the curing step.

Components I and II of white epoxy-polyamide coating military specification M1L-C-22750C were mixed together and then roll coated over the cured urethane first layer. Component I (pigmented) consisted of 30.8 parts by weight of titanium dioxide, 6.7 parts by weight methyl isobutyl ketone, 0.3 parts by weight of silicone resin solution (60%) anti-cratering agent, and 26.6 parts by weight epoxy resin (75% in toluene). Component II (clear) consisted of 15.3 parts by weight of polyamide (70% in xylene), 13.9 parts by weight of pure xylene, 3.4 parts by weight of butyl alcohol, and 3.0 parts by weight of isopropyl alcohol. The mixture of components I and II was allowed to set for 1 hours after mixing. 8 gallons of the epoxy-polyamide paint were then poured into the warhead; the warhead was then rolled around until all of the interior surface of the warhead was coated with epoxy-polyamide paint and the excess was then poured out. The warhead was then drained and cured for 16 hours at temperatures between 120° F and 140° F. The epoxy-polyamide coating was completely cured and all solvents were removed. A nitrocellulose based rubbery explosive PBXN-103 was poured into the warhead in an uncured state. The explosive contained metriol trinitrate, resorcinol, triethylene glycol dinitrate, and ethyl centralite, as well as ammonium perchlorate, aluminum, and plastisol nitrocellulose. The loaded warhead was then cured for 24 hours at temperatures in the range of 120° F. to 140° F. The uncured urethane potting mixture was prepared as follows: (A) 43.4 parts by weight of the hydroxy-terminated 1,3-polybutadiene intermediate polymer (Poly B-D, R-45M), (B) 0.01 parts by weight of dibutyltin dilaurate, (C) 0.5 parts by weight of 4,4-methylene bis (2,6-di-tert-butylphenol), and (D) 5.0 parts by weight of carbon black were thoroughly mixed together for 20 minutes at a temperature in the range of 50° F to 75° F and an absolute pressure of 1.0 inches of mercury or less. (E) 43.4 parts by weight of the hydrocarbon process oil and (F) 5.0 parts by weight of the hollow phenolic microspheres were added to the mixture, and the mixture was thoroughly mixed for another 15 minutes at the same temperature and pressure. (G) 2.69 parts of toluene 2,4-diisocyanate were then added and the mixture was mixed for another 15 minutes at the same temperature and pressure. From about 0.7 to about 2.4 pounds of this mixture was poured into the forward (open) part of the warhead. The warhead was rocked on a casting cart until all of the exposed surface of the explosive was coated with the potting compound. The warhead (explosive and potting compound) was cured for 16 hours at a temperature between 120° F and 140° F. Additional white epoxy-polyamide (M1L-C-22750C), components I and II, was prepared and allowed to set for one hour after mixing. The exposed surface of the potting urethane layer was then painted with one coat of the white epoxypolyamide mixture and then dried and cured for 16 hours at temperatures between 120° F and 140° F (until all of the solvents had dried off and the epoxy-polyamide had hardened). The ingredients of a room temperature foaming and vulcanizing silicone rubber compound (WS 14380, a Naval Ordnance System Standard, available from the Naval Surface Weapons Center, White Oak, Md.) were mixed together. This foaming and vulcanizing silicone rubber compound has the following physical characteristics (1) a specific gravity of from 1.05 to 1.13 g/cc, (2) a pot life of from 1 to 8 minutes, (3) a free foamed density of from 9 to 25 lbs/ft.$^3$ and (4) a viscosity of from 2,000 to 10,000 centipoise at 77° F one minute after mixing. After the ingredients were mixed together, 6 ounces by weight of the foaming silicone rubber was poured into the warhead and used to form a protective layer of foam rubber over the hard epoxy-polyamide paint. The surface of the foamed rubber was painted with a room-temperature vulcanizing silicone rubber compound (M1L-S-23586), Class 2, grade A. The warhead was then kept at temperatures of from 120° F to 140° F until the curing of the rubbery explosive was completed (from 16 to 136 additional hours).

As will be evident to those skilled in the art, various modifications can be made, or followed, in the light of the foregoing disclosure and discussion, without departing from the spirit or the scope of the disclosure or the scope of the claims.

What is claimed as new and desired to be secured by Letters Patent of the United States is:

1. In a warhead having a casing, a liner covering the inner surface of the casing, and a rubbery, plasticized explosive within the casing, the improvement comprising:

using as said liner a two layer composite comprising:
A. a first layer composed of a filled polyurethane elastomer formed by curing a mixture comprising:
1. a hydroxy-terminated polydiene intermediate polymer wherein:
   a. the polydiene chain of the hydroxy-terminated polydiene intermediate polymer is formed by polymerizing 1,3-diene monomers of 4 to 6 carbon atoms, the monomers having the formula:

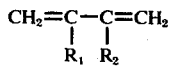

wherein $R_1$ is selected from the group consisting of —H, —CH$_3$ and —CH$_2$CH$_3$ and $R_2$ is selected from the group consisting of —H and —CH$_3$, provided that when $R_1$ is —CH$_2$CH$_3$, $R_2$ is —H, and wherein the polydiene chain may be of either a single monomer type or a mixture of different monomer types of the above formula;
   b. the polydiene chain of the hydroxy-terminated polydiene intermediate polymer has a cis-1,4-type of unsaturation content of from 10 to 30 percent, a trans-1,4-type of unsaturation content of from 40 to 70 percent, and a vinyl (1,2)-type of unsaturation content of 10 to 30 percent;
   c. the hydroxy-terminated polydiene intermediate polymer has an average of from about 1.8 to about 2.5 predominantly primary, terminal allylic hydroxy groups per average molecule; and
   d. the average molecular weight of the hydroxy-terminated polydiene intermediate polymers is from about 1,000 to about 5,000;
2. a hydrocarbon process oil, wherein the weight of hydrocarbon process oil used is from more than zero to about 4 times the weight of hydroxy-terminated polydiene intermediate polymer used;
3. a diisocyanate in an amount sufficient to supply from about 0.7 to about 1.3 isocyanate functional groups for each hydroxy functional group on the intermediate polymer;
4. hollow phenolic microspheres constituting from more than zero to about 20 percent by weight of the total uncured mixture;
5. carbon black constituting from more than zero to about 15 percent of the total weight of the mixture; and
6. asbestos fibers constituting from more than zero to about 8 percent of the total weight of the mixture;
B. a second layer composed of a hard, solvent-resistant epoxy-polyamide;
the first layer covering the inner surface of the warhead casing and the second layer covering the inner surface of the first layer.

2. The warhead liner of claim 1 wherein the polydiene chain of the hydroxy-terminated polydiene intermediate polymer is formed by polymerizing 1,3-polybutadiene.

3. The warhead liner of claim 1 wherein the hydroxy-terminated polydiene intermediate polymer has an average of from 2.1 to 2.3 predominantly primary, terminal, allylic hydroxy groups per average molecule.

4. The warhead liner of claim 1 wherein the average molecular weight of the hydroxy-terminated polydiene intermediate polymers is from 2000 to 3500.

5. The warhead liner of claim 1 wherein the weight of hydrocarbon process oil used is from 0.8 to 1.2 times the weight of hydroxy-terminated polydiene intermediate polymer used.

6. The warhead liner of claim 1 wherein the diisocyanate is used in an amount sufficient to provide from 0.8 to 1.0 isocyanate functional groups for each hydroxy functional group on the hydroxy-terminated polydiene intermediate polymer.

7. The warhead liner of claim 1 wherein the diisocyanate is an aromatic diisocyanate.

8. The warhead liner of claim 7 wherein the diisocyanate is selected from the group consisting of 2,4-toluene diisocyanate, 2,6-toluene diisocyanate, and mixtures thereof.

9. The warhead liner of claim 1 wherein the hollow phenolic microspheres constitute from 8.0 to 13.0 percent by weight of the uncured mixture.

10. The warhead liner of claim 9 wherein the hollow phenolic microspheres constitute from 9.50 to 10.50 percent by weight of the uncured mixture.

11. The warhead liner of claim 1 wherein the carbon black constitutes from 3.0 to 8.0 percent by weight of the uncured mixture.

12. The warhead liner of claim 11 wherein the carbon black constitutes from 4.9 to 5.1 percent by weight of the uncured mixture.

13. The warhead liner of claim 1 wherein the asbestos fibers constitute from 1.0 to 3.0 percent by weight of the uncured mixture.

14. The warhead liner of claim 13 wherein the asbestos fibers constitute from 1.9 to 2.1 percent by weight of the uncured mixture.

* * * * *